I. D. KRESS.
PACKAGE FASTENER.
APPLICATION FILED SEPT. 25, 1911.
1,027,858.
Patented May 28, 1912.
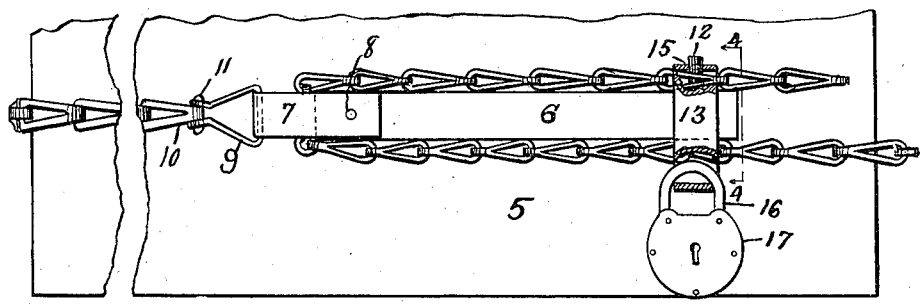
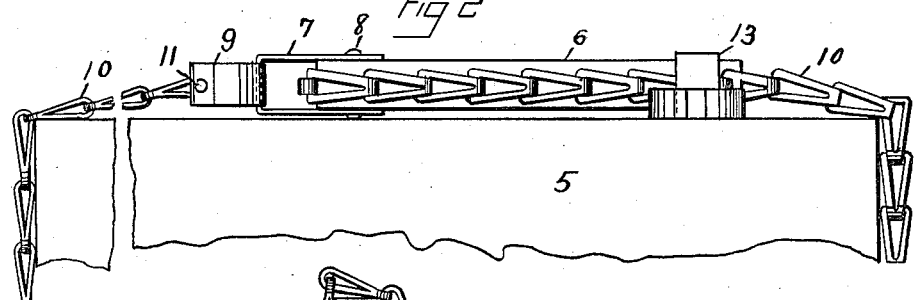
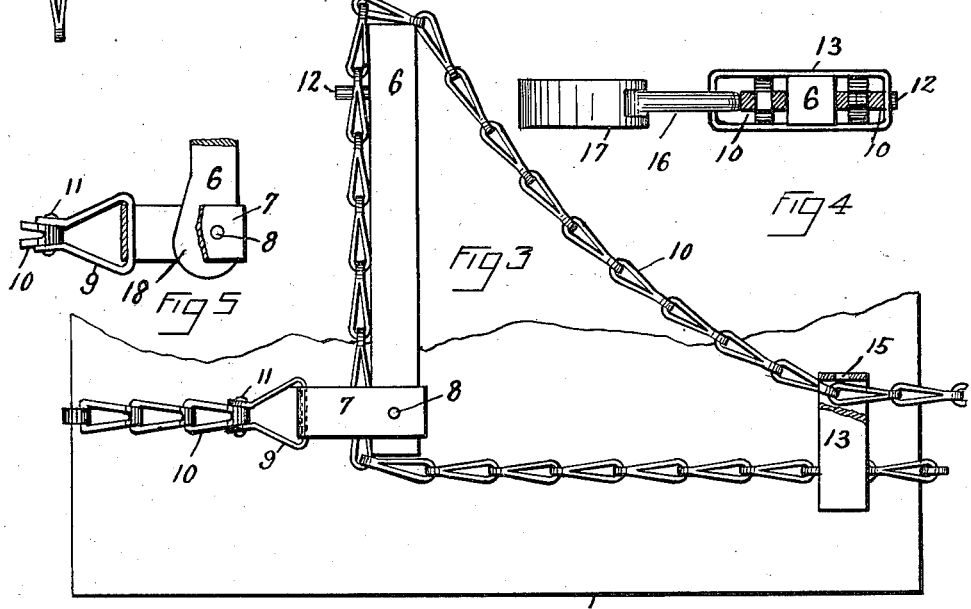

UNITED STATES PATENT OFFICE.

IRA D. KRESS, OF LOS ANGELES, CALIFORNIA.

PACKAGE-FASTENER.

1,027,858.  Specification of Letters Patent.  Patented May 28, 1912.

Application filed September 25, 1911. Serial No. 651,122.

*To all whom it may concern:*

Be it known that I, IRA D. KRESS, a citizen of the United States, residing at Los Angeles, county of Los Angeles, and State of California, have invented new and useful Improvements in Package-Fasteners, of which the following is a specification.

My invention relates to that class of fasteners in which chains are provided adapted to encircle the package so that by means of a tension device the chain may be properly strained; and the object thereof is to provide a simple, strong and easily adjusted device for that purpose, which can be locked in its strained position. I accomplish this object by means of the device described herein and illustrated in the accompanying drawings as applied to a trunk, in which;

Figure 1 is a top plan view of a fragment of a trunk showing the device with parts in section in its locked position, when in use. Fig. 2 is a side elevation of a fragment of a trunk with so much of my fastening as is necessary to illustrate my invention. Fig. 3 is a top plan view of a fragment of a trunk showing the device in its adjusted position preparatory to straining the chain, with parts in section. Fig. 4 is an end elevation partly in section, taken on the line 4—4 of Fig. 1. Fig. 5 is a plan view partly in section of a modified form of my invention.

My device consists preferably of a tensioning lever 6 which is preferably a square bar, having a clevis 7 secured to and near one end thereof by means of a pintle bolt or pivot 8, said clevis 7 being adapted to turn on its pivot to a position at an angle to said lever 6 and on either side thereof. In the outer end of said clevis 7 is mounted a strap link 9 to which is secured one end of a safety chain 10 by means of a rivet 11. Near and at a short distance from the other end of said lever is rigidly mounted a securing stud 12. A locking slide formed of strap metal with sides and ends parallel is provided with an opening or port 15 in one of its ends, said port being adapted to permit the securing stud to pass therethrough when the device 1 is positioned for use.

In the operation of my device the chain is first placed around the trunk 5 with the lever preferably on the top or one end, of the trunk with clevis 7 preferably at right angles to the lever. The loose end of the chain is then threaded first through the locking slide 13, then through the clevis 7 and drawn as tight as can be done by hand. A link is then drawn over the securing stud 12. The lever is then turned to a position parallel to the clevis 7 which tightens the chain securely around the trunk. The loose end of the chain is then threaded through the locking slide 13 and the slide is moved along the chain until the securing stud registers with opening 15 of said slide. The slide is then drawn to force the link on stud 12 against the lever. The shank 16 of a padlock 17 is passed through the other end of the slide and locked, thus preventing the slide being drawn off stud 12 and keeping the device in a locked position.

It will be understood that shank 16 of padlock 17 will be of a diameter sufficient to so fill the space between the end of the slide and the chain that it cannot be removed from the stud 12 until the shank of the padlock is removed from the slide.

It will be understood that the sides of the slide snugly fit the lever and the ends are sufficiently far apart to receive the lever and two strands of the chain, and to slide thereon and that it will prevent the lever turning in the clevis.

In Fig. 5 a modified form of the tensioning lever is shown. In this form the tensioning end of the lever is provided with a cam shaped head 18 so as to give more surface on the tensioning end of the lever.

In the drawings I have illustrated my device applied to a trunk, but it may be used on any other kind of package.

Having described my invention what I claim is:

1. A package fastener comprising a tensioning lever; a clevis pivotally mounted on said lever near one end thereof; a securing stud on the lever near the other end thereof; a chain secured to said clevis and adapted to pass around the package, through the clevis and to the other end of the lever when angularly disposed as to the plane of the clevis; and a securing slide having a port in one end, said slide adapted to be moved upon the chain and lever to fasten the chain upon the securing stud.

2. A package fastener comprising a tensioning lever; a clevis pivotally mounted on said lever near one end thereof; a securing stud on the lever near the other end thereof; a chain secured to said clevis and adapted to pass around the package, through the clevis and to the other end of the lever when angularly disposed as to the plane of the clevis; and a securing slide having a port in one end, said slide adapted to be moved upon the chain and lever to fasten the chain upon the securing stud; in combination with a locking means to fasten the slide upon the stud of the lever.

In witness that I claim the foregoing I have hereunto subscribed my name this 18th day of September, 1911.

IRA D. KRESS.

Witnesses:
G. E. HARPHAM,
FRANK WATERFIELD.

Copies of this patent may be obtained for five cents each, by addressing the "Commissioner of Patents, Washington, D. C."